United States Patent
Fujii et al.

(10) Patent No.: US 8,729,754 B2
(45) Date of Patent: May 20, 2014

(54) MOTOR INCUDING BEARING SUPPORTED BY BUSBAR HOLDER

(75) Inventors: Yoshio Fujii, Kyoto (JP); Hisashi Fujihara, Kyoto (JP); Kenichiro Hamagishi, Kyoto (JP); Yosuke Yamada, Kyoto (JP)

(73) Assignee: Nidec Corporation, Kyoto (JP)

( * ) Notice: Subject to any disclaimer, the term of this patent is extended or adjusted under 35 U.S.C. 154(b) by 307 days.

(21) Appl. No.: 12/921,781

(22) PCT Filed: Mar. 12, 2009

(86) PCT No.: PCT/JP2009/054794
§ 371 (c)(1),
(2), (4) Date: Sep. 10, 2010

(87) PCT Pub. No.: WO2009/113629
PCT Pub. Date: Sep. 17, 2009

(65) Prior Publication Data
US 2011/0006625 A1    Jan. 13, 2011

(30) Foreign Application Priority Data

Mar. 13, 2008 (JP) ................................ 2008-063628

(51) Int. Cl.
*H02K 11/00* (2006.01)
*H02K 5/16* (2006.01)

(52) U.S. Cl.
USPC ............................ 310/71; 310/68 B; 310/90

(58) Field of Classification Search
USPC .......................................... 310/71, 68 B, 90
IPC .............................................. H02K 5/22,11/00
See application file for complete search history.

(56) References Cited

U.S. PATENT DOCUMENTS

| | | | |
|---|---|---|---|
| 4,584,495 A * | 4/1986 | Kordik ........................ | 310/49.32 |
| 6,577,029 B1 * | 6/2003 | Weber et al. ................ | 310/68 R |
| 6,914,356 B2 * | 7/2005 | Yamamura et al. ............ | 310/71 |

(Continued)

FOREIGN PATENT DOCUMENTS

| JP | 2000-201417 A | 7/2000 |
|---|---|---|
| JP | 2003-020961 A | 1/2003 |

(Continued)

OTHER PUBLICATIONS

Machine Translation (JP 2007-221976A).*
English Language Translation of Official Communication issued in corresponding International Application No. PCT/JP2009/054794, mailed on Nov. 2, 2010.

(Continued)

*Primary Examiner* — John K Kim
*Assistant Examiner* — Thomas Truong
(74) *Attorney, Agent, or Firm* — Keating & Bennett, LLP

(57) ABSTRACT

In a busbar unit, which is a distributing device arranged to supply electrical currents to coils, a busbar holder is arranged to support coil connection busbars and sensor connection busbars. A bottom surface portion of a busbar holder body portion includes a bearing holder holding a bearing defined therein, and includes resistors and capacitors defining a portion of a Hall IC circuit arranged thereon. The Hall IC circuit is arranged to input and output electrical signals to or from Hall ICs. An upper surface portion includes sensor holders each holding a separate one of the Hall ICs defined therein. A connector portion is arranged to project radially outward from the busbar holder body portion. The sensor connection busbars and each of the coil connection busbars are arranged one above another along an axial direction.

8 Claims, 14 Drawing Sheets

(56) References Cited

U.S. PATENT DOCUMENTS

| | | |
|---|---|---|
| 7,847,447 B2 * | 12/2010 | Kume et al. ............... 310/83 |
| 2002/0067094 A1 * | 6/2002 | Okazaki et al. ............ 310/180 |
| 2006/0068617 A1 * | 3/2006 | Migita et al. .............. 439/76.2 |
| 2006/0091745 A1 * | 5/2006 | Klappenbach et al. ...... 310/71 |
| 2006/0138883 A1 * | 6/2006 | Yagai et al. ............... 310/71 |
| 2006/0226719 A1 * | 10/2006 | Nakanishi et al. ......... 310/68 B |
| 2007/0007917 A1 | 1/2007 | Yagi |
| 2007/0080592 A1 * | 4/2007 | Ohta et al. ................ 310/71 |
| 2007/0145838 A1 * | 6/2007 | Uchitani et al. ........... 310/68 B |
| 2007/0145839 A1 * | 6/2007 | Kimura et al. ............ 310/68 B |
| 2007/0178723 A1 * | 8/2007 | Kataoka et al. ........... 439/76.2 |
| 2007/0205679 A1 * | 9/2007 | Terauchi et al. ........... 310/71 |

FOREIGN PATENT DOCUMENTS

| | | | |
|---|---|---|---|
| JP | 2004-313000 A | 11/2004 | |
| JP | 2005-45878 A | 2/2005 | |
| JP | 2007-006592 A | 1/2007 | |
| JP | 2007-221976 A | 8/2007 | |
| JP | 2007221976 * | 8/2007 | ............ H02K 29/08 |

OTHER PUBLICATIONS

Official Communication issued in International Patent Application No. PCT/JP2009/054794, mailed on May 26, 2009.

Fujii et al., "Motor", U.S. Appl. No. 12/921,783, filed Sep. 10, 2010.

* cited by examiner

MOTOR INCUDING BEARING SUPPORTED BY BUSBAR HOLDER

BACKGROUND OF THE INVENTION

1. Field of the Invention

The present invention relates to a motor.

2. Description of the Related Art

JP-A 2007-006592 discloses a conventional brushless motor in which a drive current is supplied to each coil without the use of a busbar, with a view to achieve a reduction in the size of the brushless motor. Specifically, an insulator covering a stator is arranged to support connector fittings which serve as terminals of windings. In addition, an externally projecting pin arranged to establish electrical continuity between an inside and an outside of the motor is supported by a bearing holder. The windings and the externally projecting pin are connected to the connector fittings by welding.

As described above, the brushless motor disclosed in JP-A 2007-006592 is structured such that the drive current is supplied to each coil without the use of a busbar, in order to achieve a reduction in size.

However, the provision of the connector fittings between the windings and the externally projecting pin results in an increased number of parts used when assembling the brushless motor. Moreover, when the brushless motor is assembled, it is necessary to weld the connector fittings to the windings and weld the connector fittings to the externally projecting pin. The increased number of parts thus involves an increased number of welding points, which complicates an operation of assembling the brushless motor.

SUMMARY OF THE INVENTION

A motor according to preferred embodiments of the present invention includes a rotor, a stator core, a plurality of coils, and a busbar unit. The busbar unit includes a plurality of coil connection busbars and a busbar holder. Each of the plurality of coil connection busbars includes a conductor wire connection portion connected with an end portion of a conductor wire defining the coils. The busbar holder is made of an insulating material and arranged to support the plurality of coil connection busbars. In addition, the busbar holder includes a bearing holder arranged to hold a bearing arranged to rotatably support a shaft arranged to rotate integrally with the rotor.

In a motor according to a preferred embodiment of the present invention, a bearing holder is defined in a busbar holder. Therefore, it is possible to assemble the motor with a bearing already held in the busbar holder. This contributes to reducing the number of parts, and makes it easy to assemble the motor.

DETAILED DESCRIPTION OF THE PREFERRED EMBODIMENTS

Figure 1:
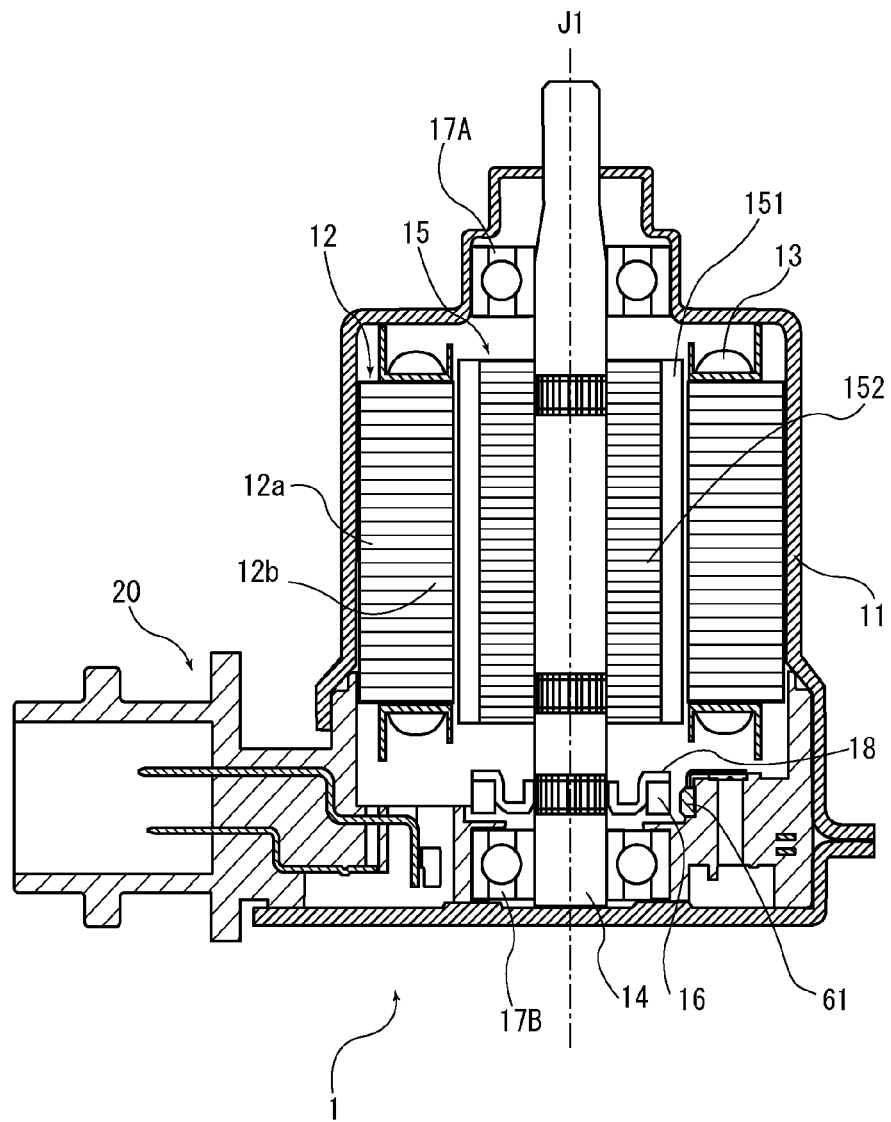
FIG. 1 is a cross-sectional view of a motor according to a preferred embodiment of the present invention.

Hereinafter, preferred embodiments of the present invention will be described with reference to the accompanying drawings. FIG. 1 is a side cross-sectional view of a brushless motor 1 according to a preferred embodiment of the present invention. The brushless motor 1 illustrated in FIG. 1 includes a housing 11, a stator core 12, coils 13, a shaft 14, a rotor 15, a sensor magnet 16, and a busbar unit 20. The brushless motor 1 is used, for example, to select a gear of a transmission installed on a vehicle, or to drive a clutch. The brushless motor 1 is driven through an electrical current supplied from a power supply unit (not shown), such as, for example, a battery, through a control unit (not shown), such as, for example, an ECU.

The brushless motor 1 may be installed in an apparatus in various manners depending on the apparatus, and also may be arranged in various orientations. Therefore, no absolute upward/downward directions exist for the brushless motor 1. However, for the sake of convenience, it is assumed in the following description that upward/downward directions in FIG. 1 are upward/downward directions of the brushless motor 1.

Figure 16:
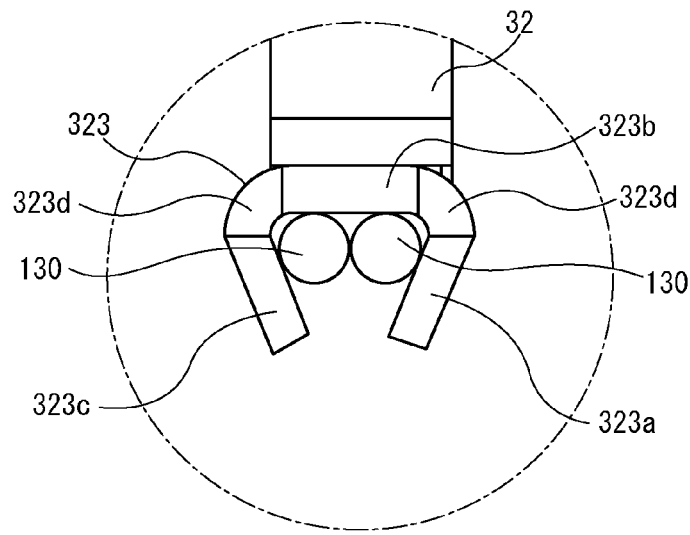
FIG. 16 is a diagram illustrating the state of a conductor wire connection portion and end portions of a conductor wire according to a preferred embodiment of the present invention prior to welding.
Figure 17:
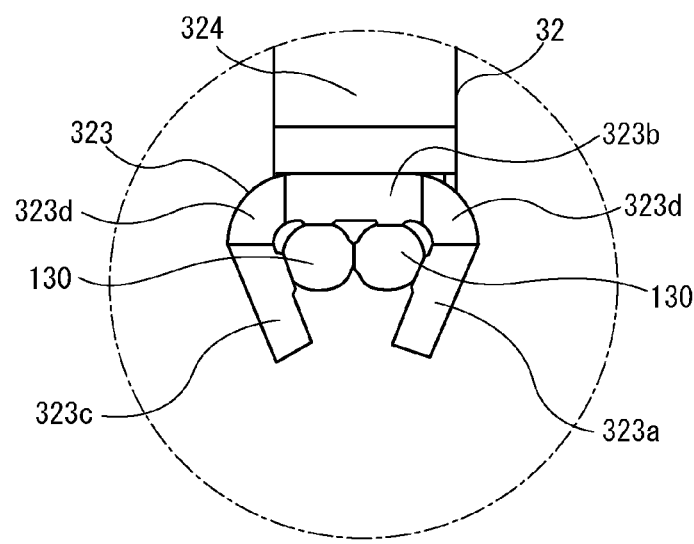
FIG. 17 is a diagram illustrating the state of the conductor wire connection portion and the end portions of the conductor wire according to a preferred embodiment of the present invention after the welding.

The housing 11 preferably has a substantially cylindrical shape and is centered on a rotation axis J1 of the brushless motor 1. The stator core 12 is fixed to an inner circumferential surface of the housing 11. The stator core 12 includes a core back portion 12a and a plurality of tooth portions 12b. The core back portion 12a preferably is substantially annular and centered on the rotation axis J1. The tooth portions 12b are arranged to extend radially from the core back portion 12a toward the rotation axis J1. A conductor wire 130, ends of which are shown in FIGS. 16 and 17, is wound around each of the tooth portions 12b to define the coils 13.

In addition, ball bearings 17A and 17B are held in an upper portion of the housing 11 and a lower portion of the busbar unit 20, respectively. The shaft 14, which is centered on the rotation axis J1, is rotatably supported by the ball bearings 17A and 17B.

The rotor 15 preferably includes a rotor magnet 151 and a rotor core 152, and is arranged to rotate integrally with the shaft 14. The rotor magnet 151 is fixed to an outer circumferential surface of the rotor core 152, which is fixed to the shaft 14. The sensor magnet 16 is arranged below the rotor 15, and held by a sensor yoke 18 fixed to the shaft 14.

The busbar unit 20 is arranged to cover a lower side of the stator core 12. The busbar unit 20 is a distributing device arranged to supply electrical currents to the coils 13. The busbar unit 20 preferably holds a plurality of Hall ICs 61 such that the Hall ICs 61 are arranged radially outwardly opposite the sensor magnet 16.

In the brushless motor 1 having the above-described structure, the electrical currents are supplied from the power supply unit to the coils 13 through the control unit in accordance with the rotational position of the rotor magnet 151. A magnetic field is generated upon energization of the coils 13 to rotate the rotor magnet 151. The brushless motor 1 is arranged to obtain a rotational driving force in the above-described manner.

Figure 2:
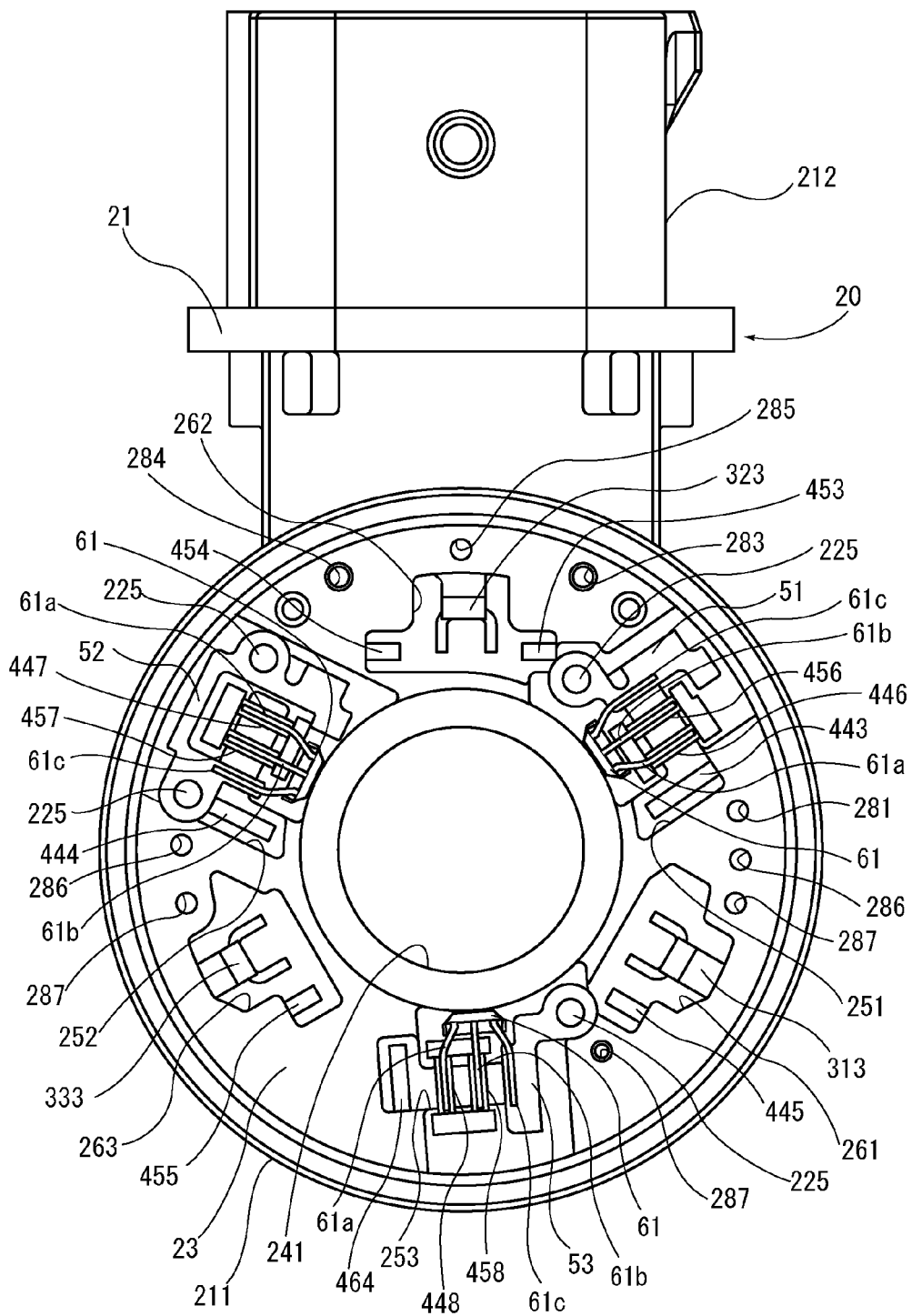
FIG. 2 is a top view of a busbar unit according to a preferred embodiment of the present invention.
Figure 3:
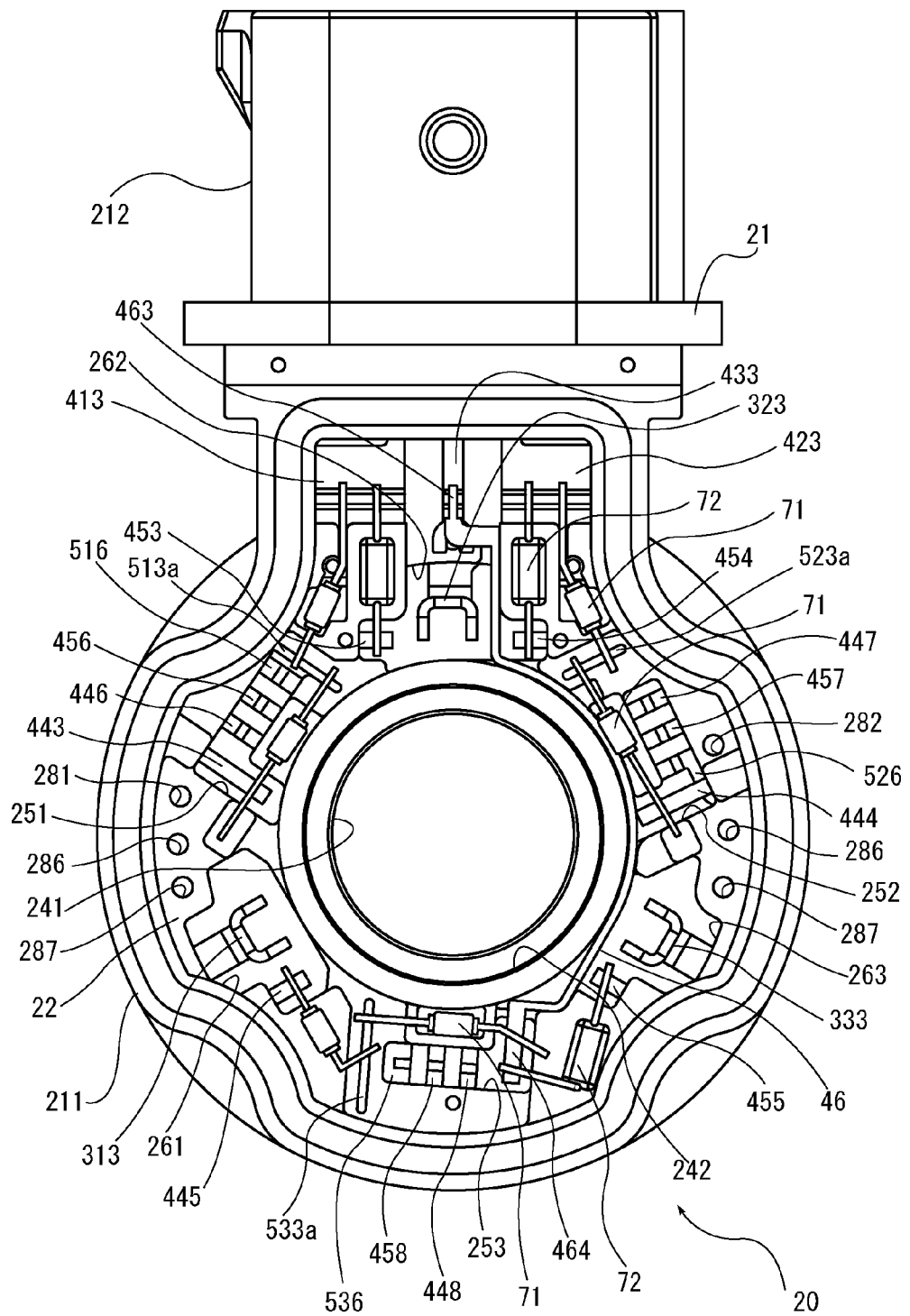
FIG. 3 is a bottom view of the busbar unit according to a preferred embodiment of the present invention.
Figure 4:
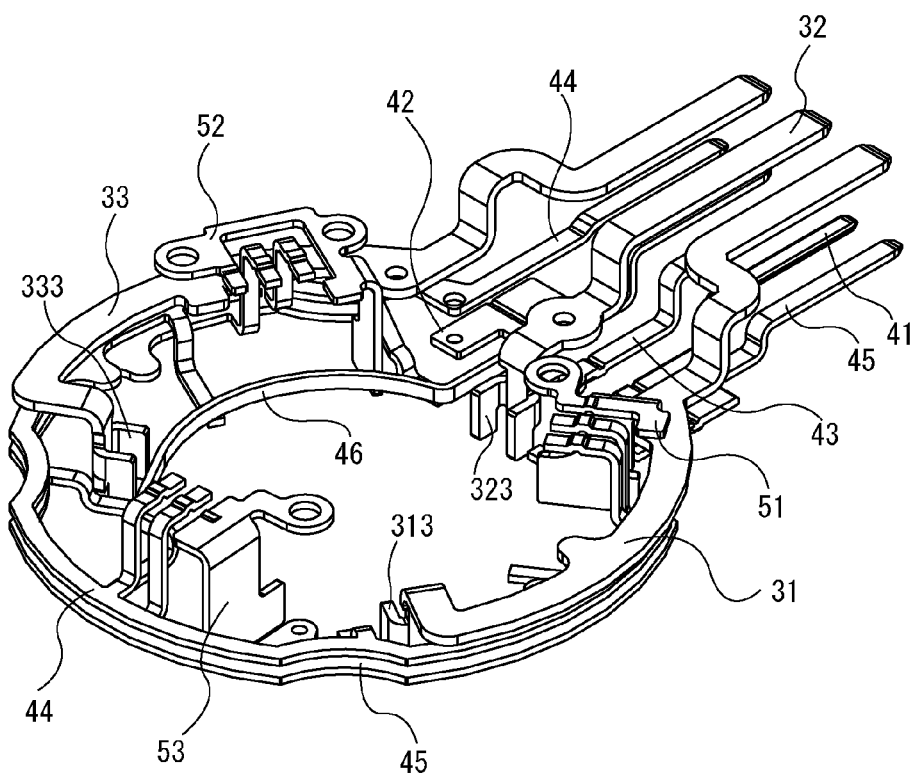
FIG. 4 is a diagram illustrating an arrangement of various busbars according to a preferred embodiment of the present invention defining a portion of the busbar unit.

FIG. 2 is a top view of the busbar unit 20. In other words, FIG. 2 illustrates the busbar unit 20 when viewed from the direction of the stator core 12. FIG. 3 is a bottom view of the busbar unit 20. FIG. 4 illustrates an arrangement of various busbars defining a portion of the busbar unit 20. Note that, in FIG. 4, a busbar holder 21 is omitted from illustration. In FIG. 4, the upper side (i.e., the side on which the stator core 12 is arranged) is a side on which coil connection busbars 31, 32, and 33 are arranged, while the lower side is a side on which a sensor connection busbar 45 is arranged.

As illustrated in FIGS. 2 to 4, the busbar unit 20 preferably includes the busbar holder 21, the plurality of Hall ICs 61, a plurality of coil connection busbars, a plurality of sensor connection busbars, and a plurality of electronic components. The busbar holder 21 is made of an insulating material, and includes a busbar holder body portion 211 and a connector portion 212. The busbar holder body portion 211 preferably is substantially circular in plan view. The connector portion 212 is arranged radially outward of the busbar holder body portion 211.

As illustrated in FIG. 2, each Hall IC 61 is arranged on an upper surface portion 23 of the busbar holder body portion 211 to output a Hall signal in accordance with the position of the sensor magnet 16. Each Hall IC 61 includes a power supply terminal 61a used for power input, a ground terminal 61b used for grounding, and an output terminal 61c used to output the Hall signal.

Also, referring to FIG. 4, the plurality of coil connection busbars and the plurality of sensor connection busbars are supported by the busbar holder 21.

The coil connection busbars 31, 32, and 33 are electrically conductive members arranged to supply three-phase electrical currents to the coils 13. Sensor connection busbars 41, 42, 43, 46, 51, 52, and 53 are electrically conductive members used to output, to the control unit, the Hall signals outputted from the Hall ICs 61. A sensor connection busbar 44 is an electrically conductive member used to supply power to each Hall IC 61. The sensor connection busbar 45 is an electrically conductive member used to ground each Hall IC 61.

Also, as illustrated in FIG. 3, as the plurality of electronic components, a plurality of resistors 71 and a plurality of capacitors 72 are arranged on a bottom surface portion 22 of the busbar holder body portion 211. This contributes to inhibiting heat generated from the coils 13 from changing properties of the plurality of resistors 71 or the plurality of capacitors 72.

The plurality of sensor connection busbars, the plurality of resistors 71, and the plurality of capacitors 72 together define a Hall IC circuit. The Hall IC circuit is a circuit designed to supply power to each Hall IC 61, and output to the control unit the Hall signals outputted from the Hall ICs 61. The Hall IC circuit is designed in accordance with the number of Hall ICs 61 arranged on the busbar unit 20. The above-described provision of the Hall IC circuit on the busbar holder body portion 211 eliminates the need to provide a space in which to arrange a circuit board, making it possible to reduce the size of the busbar unit 20.

Also, as illustrated in FIG. 4, the coil connection busbar 31 and the sensor connection busbars 44 and 45 are arranged one above another along an axial direction, whereas the coil connection busbar 33 and the sensor connection busbars 44 and 45 are arranged one above another along the axial direction. This contributes to reducing the radial dimension of the busbar unit 20.

Figure 5:
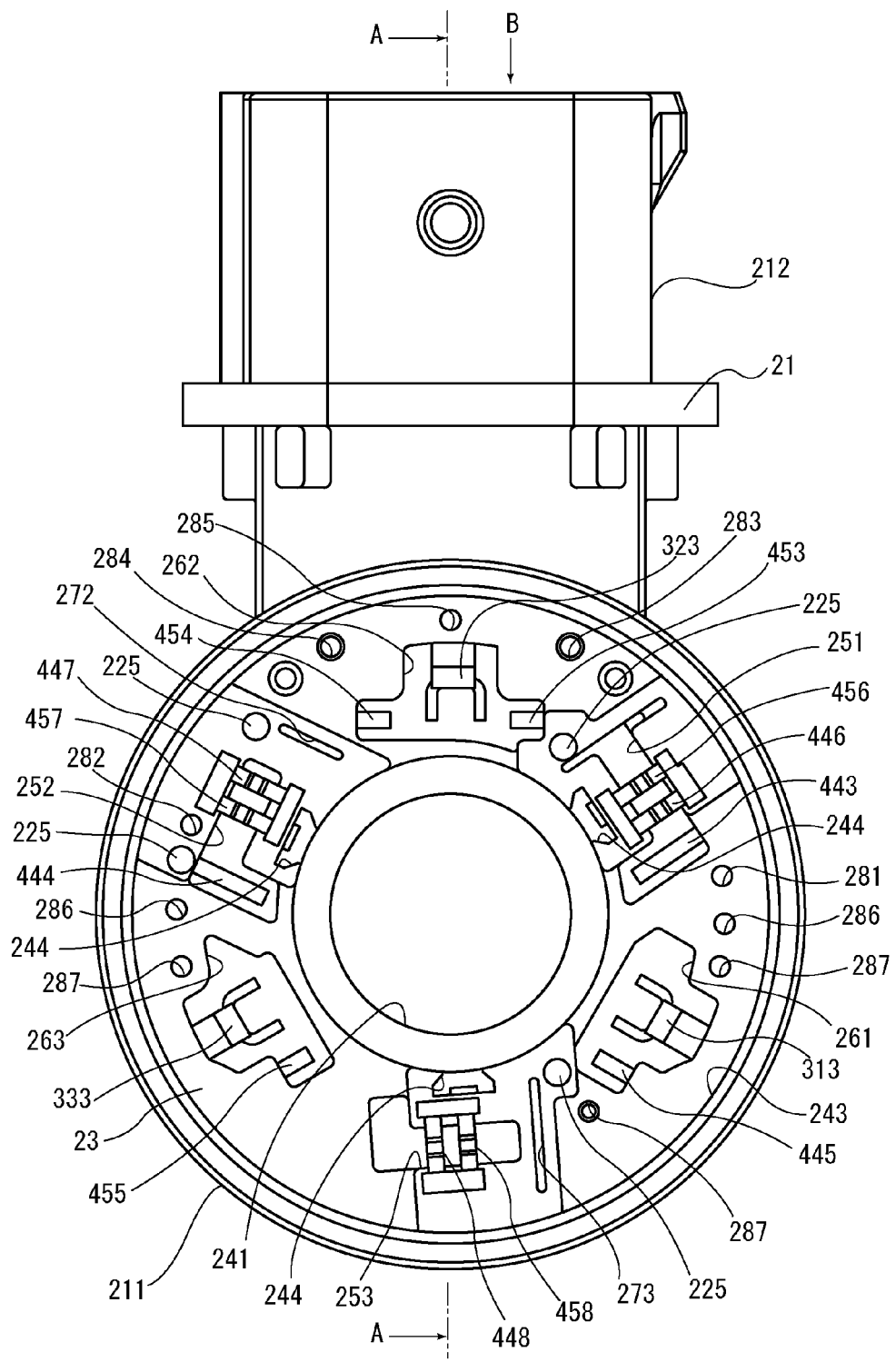
FIG. 5 is a top view of a busbar holder according to a preferred embodiment of the present invention.
Figure 6:
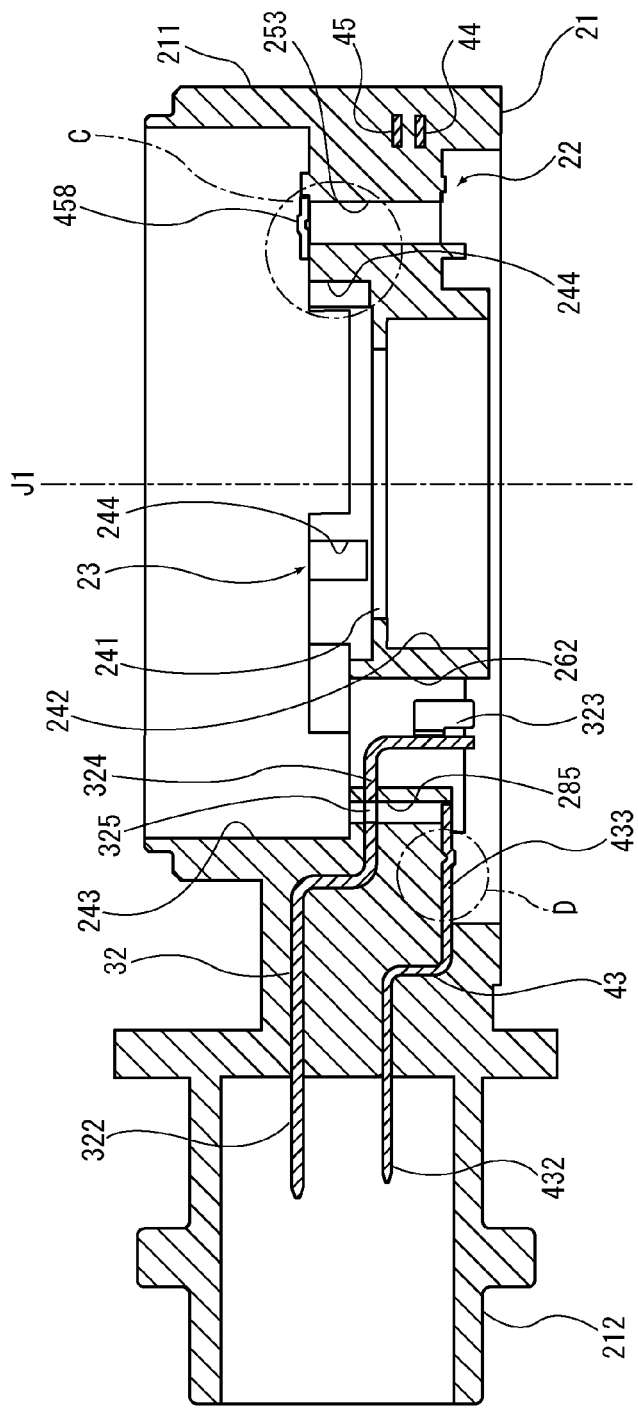
FIG. 6 is a cross-sectional view of the busbar holder taken along arrowed line A-A in FIG. 5.
Figure 7:
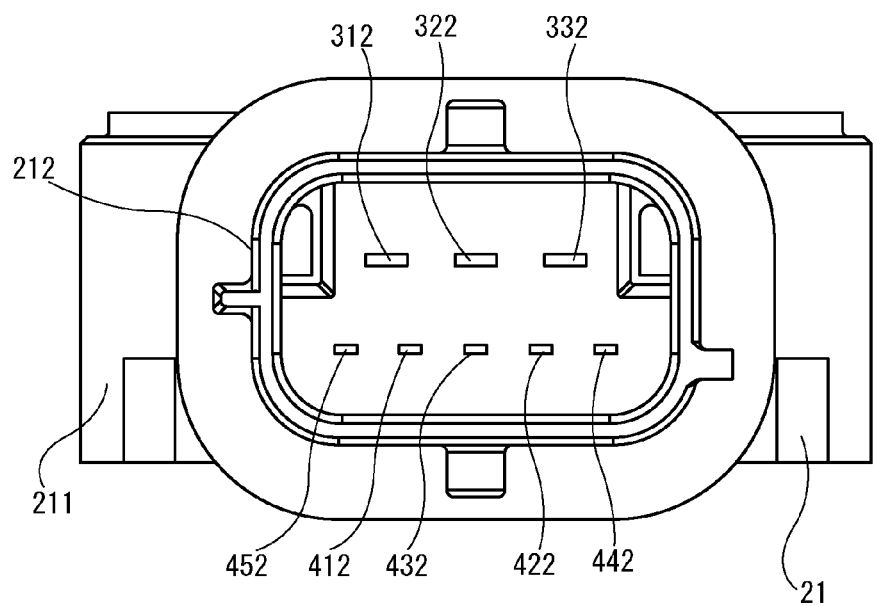
FIG. 7 is a side view of the busbar holder when viewed from a direction indicated by arrow B in FIG. 5.

FIG. 5 is a top view of the busbar holder 21. FIG. 6 is a cross-sectional view of the busbar holder 21 taken along arrowed line A-A in FIG. 5. FIG. 7 is a side view of the busbar holder 21 when viewed from a direction indicated by arrow B in FIG. 5.

As illustrated in FIGS. 5 and 6, the coil connection busbars 31, 32, and 33 and the sensor connection busbars 41, 42, 43, 44, and 45 are partially buried in the busbar holder 21. The busbar holder 21, the coil connection busbars 31, 32, and 33, and the sensor connection busbars 41, 42, 43, 44, and 45 are preferably formed integrally by, for example, insert molding.

The busbar holder body portion 211 has a center hole 241 which is substantially circular and which is centered on the rotation axis J1. The shaft 14 is inserted through the center hole 241. The bottom surface portion 22 of the busbar holder body portion 211 has a bearing holder 242 defined therein so as to surround the center hole 241. The bearing holder 242 defines a hole opening downward in the busbar holder body portion 211, and is arranged to hold the ball bearing 17B.

The busbar holder body portion 211 has an opening hole 243 defined above it, and a bottom surface of the opening hole 243 defines the upper surface portion 23 of the busbar holder body portion 211. The upper surface portion 23 has a plurality of sensor holders defined therein which are arranged to hold the Hall ICs 61. Each sensor holder 244 is arranged radially outwardly opposite from the sensor magnet 16, so that each Hall IC 61 is arranged radially outwardly opposite the sensor magnet 16 with a gap therebetween. This contributes to reducing the axial dimension of the busbar unit 20.

Also, as illustrated in FIG. 5, the busbar holder body portion 211 has a plurality of through holes defined therein which extend axially from the bottom surface portion 22 to the upper surface portion 23, in addition to the center hole 241.

As illustrated in FIGS. 6 and 7, the connector portion 212 is substantially tubular in shape with a radially outward opening. At the connector portion 212, terminal portions 312, 322, and 332 of the coil connection busbars 31, 32, and 33, respectively, and terminal portions 412, 422, 432, 442, and 452 of the sensor connection busbars 41, 42, 43, 44, and 45, respectively, are arranged to project radially outward from the busbar holder body portion 211. Each of the terminal portions serves as a connector pin arranged to connect to the control unit arranged outside the brushless motor 1. A reduction in the number of parts can be achieved by forming the busbar holder body portion 211 and the connector portion 212 integrally to define the busbar holder 21 as described above.

Figure 8:
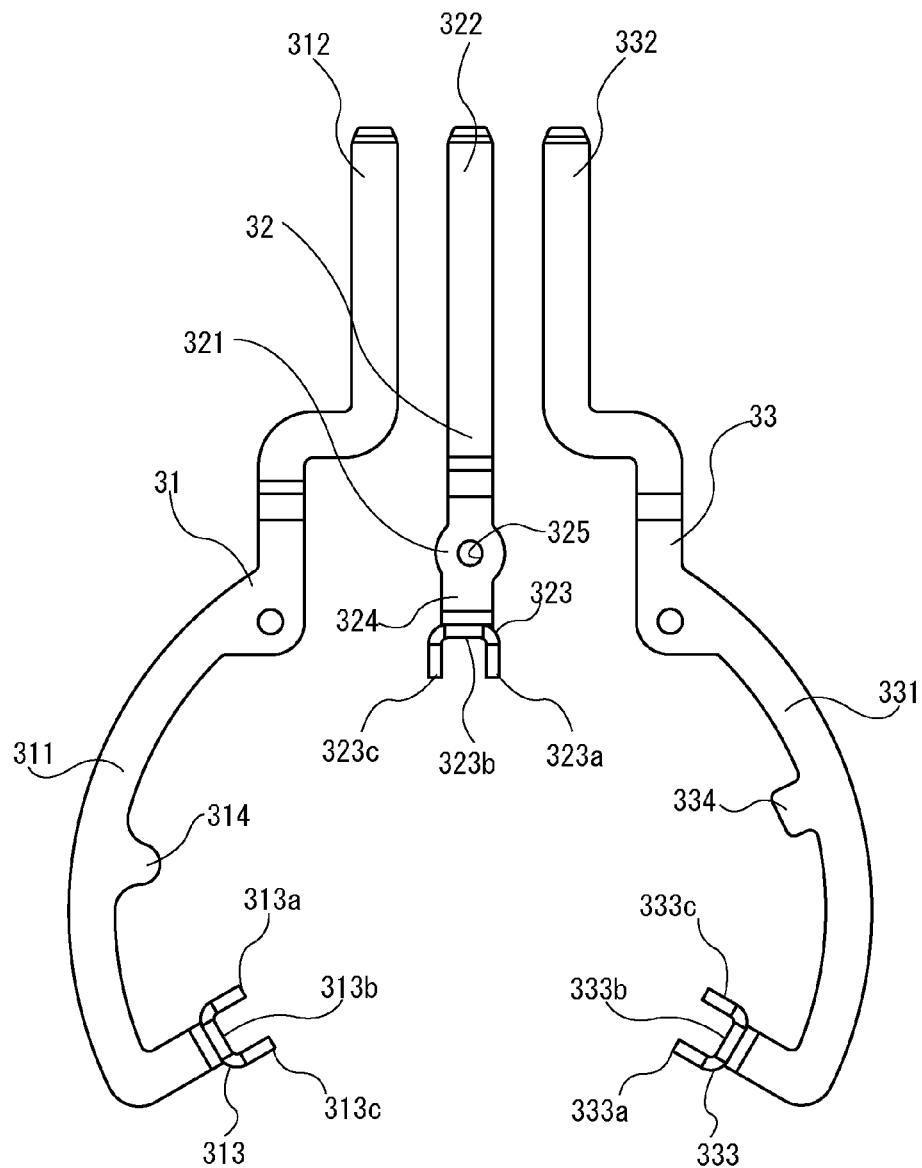
FIG. 8 is a bottom view of coil connection busbars according to a preferred embodiment of the present invention.

FIG. 8 is a bottom view of the coil connection busbars 31, 32, and 33. In other words, FIG. 8 illustrates the coil connection busbars 31, 32, and 33 as extracted from the bottom view of the busbar unit 20 of FIG. 3.

In the coil connection busbar 31, the terminal portion 312 is arranged to extend radially outward from a base portion 311 substantially in the shape of a circular arc, and a conductor wire connection portion 313 and a positioning portion 314 are arranged radially inside the base portion 311. The coil connection busbar 32 is substantially in the shape of a straight line. In the coil connection busbar 32, the terminal portion 322 is arranged to extend radially outward from a base portion 321, and a conductor wire connection portion 323 is arranged radially inside the base portion 321. In the coil connection busbar 33, the terminal portion 332 is arranged to extend radially outward from a base portion 331 substantially in the shape of a circular arc, and a conductor wire connection portion 333 and a positioning portion 334 are arranged radially inside the base portion 331. The base portions 311, 321, and 331 are buried in the busbar holder body portion 211.

As illustrated in FIG. 4, the conductor wire connection portions 313, 323, and 333 are arranged to extend radially inward from the base portions 311, 321, and 331, respectively, and thereafter be bent downward. Each of the conductor wire connection portions 313, 323, and 333 has defined therein a groove extending along the axial direction. Also, as illustrated in FIGS. 2, 3, and 5, the conductor wire connection portions 313, 323, and 333 are arranged to project radially inward from inner surfaces of through holes 261, 262, 263, respectively, and be exposed on both axial sides of the busbar holder 21. Each of the conductor wire connection portions 313, 323, and 333 is connected with two end portions of the conductor wire 130 defining the coils 13. This is because the coils 13 of the motor 1 are connected in a delta configuration.

Figure 9:
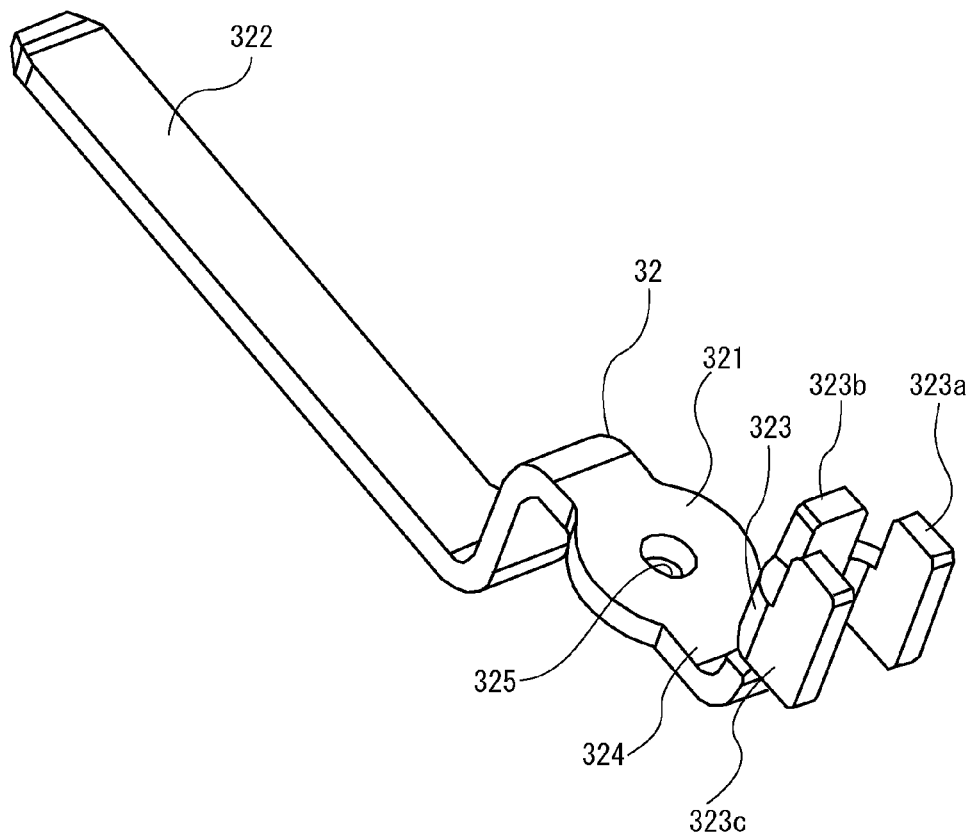
FIG. 9 is a perspective view of one of the coil connection busbars according to a preferred embodiment of the present invention.

FIG. 9 is a perspective view of the coil connection busbar 32. The conductor wire connection portion 323 includes side wall portions 323a, 323b, and 323c arranged to substantially assume the shape of the letter "U". Similar to the conductor wire connection portion 323, the conductor wire connection portion 313 includes side wall portions 313a, 313b, and 313c, and the conductor wire connection portion 333 includes side wall portions 333a, 333b, and 333c.

Each of the positioning portions 314 and 334 is preferably in the shape of a plane and perpendicular or substantially perpendicular to the axial direction. The positions of the positioning portions 314 and 334 correspond to the positions of through holes 281 and 282, respectively. That is, the positioning portions 314 and 334 are exposed on both axial sides of the busbar holder 21 through the through holes 281 and 282, respectively. A portion of the coil connection busbar 32 which corresponds to the positioning portions 314 and 334 is an extension portion 324. The extension portion 324 is a portion thereof which extends radially inward from the base portion 321, and defines the conductor wire connection portion 323. As illustrated in FIG. 6, the extension portion 324 is exposed on both axial sides of the busbar holder 21 in the through hole 262. The positioning portion 314, the extension portion 324, and the positioning portion 334 are used to fix the positions of the coil connection busbars 31, 32, and 33, respectively, at the time of the insert molding.

In addition, the coil connection busbar 32 has a through hole 325 defined substantially in the center of the base portion 321. As illustrated in FIG. 6, the position of the through hole 325 corresponds to the position of a through hole 285. The through hole 325 is used to fix the sensor connection busbar 43 at the time of the insert molding.

Figure 10:
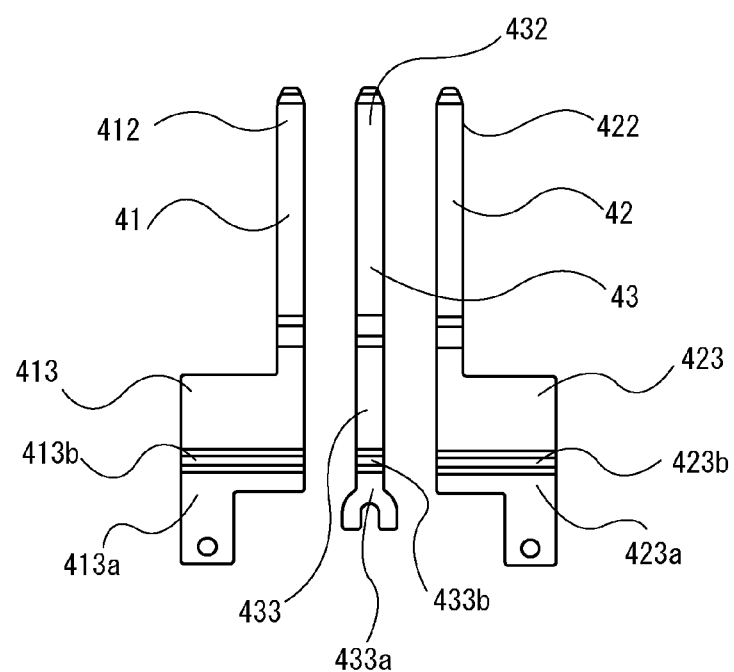
FIG. 10 is a bottom view of sensor connection busbars according to a preferred embodiment of the present invention.

FIG. 10 is a bottom view of the sensor connection busbars 41, 42, and 43. In other words, FIG. 10 illustrates the sensor connection busbars 41, 42, and 43 as extracted from the bottom view of the busbar unit 20 illustrated in FIG. 3.

The sensor connection busbar 41 includes the terminal portion 412 and an electronic component connection portion 413. The sensor connection busbar 42 includes the terminal portion 422 and an electronic component connection portion 423. The sensor connection busbar 43 includes the terminal portion 432 and an electronic component connection portion 433.

The terminal portions 412, 422, and 432 are arranged to extend radially outward from the electronic component connection portions 413, 423, and 433, respectively. The electronic component connection portions 413, 423, and 433 have projection portions 413b, 423b, and 433b, respectively, raised downward from plane portions 413a, 423a, and 433a, respectively, which are perpendicular or substantially perpendicular to the axial direction.

As illustrated in FIG. 3, the electronic component connection portions 413, 423, and 433 are arranged on the bottom surface portion 22 of the busbar holder body portion 211, and exposed on the lower side of the busbar holder 21. In addition, the positions of the electronic component connection portions 413, 423, and 433 correspond to the positions of through holes 283, 284, and 285, respectively. That is, a portion of each of the electronic component connection portions 413, 423, and 433 is exposed on the axially upper side of the busbar holder 21. Note that, as illustrated in FIG. 6, the electronic component connection portion 433 is exposed on the axially upper side of the busbar holder 21 due to the fact that the position of the through hole 285 corresponds to the position of the through hole 325 of the coil connection busbar 32. The electronic component connection portions 413, 423, and 433 are used as positioning portions to fix the sensor connection busbars 41, 42, and 43, respectively, at the time of the insert molding.

The electronic component connection portion 413 is connected with one of the resistors 71 and one of the capacitors 72 at the projection portion 413b. Similarly, the electronic component connection portion 423 is connected with one of the resistors 71 and one of the capacitors 72 at the projection portion 423b. The electronic component connection portion 433 is connected with an electronic component connection portion 463 of the sensor connection busbar 46 at the projection portion 433b.

Figure 11:
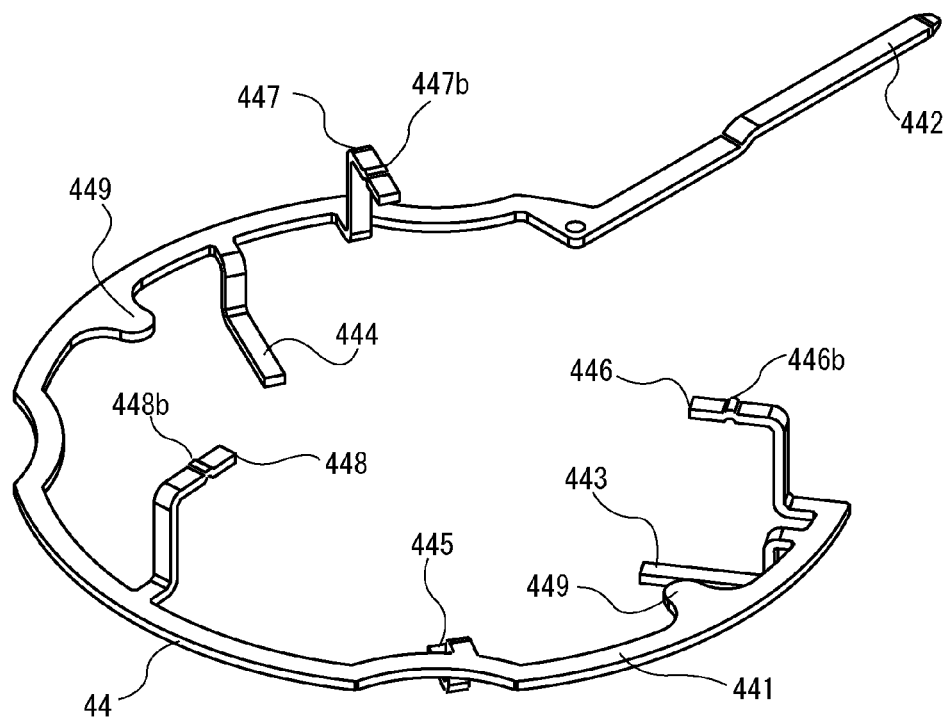
FIG. 11 is a perspective view of a sensor connection busbar according to a preferred embodiment of the present invention used to supply power to Hall ICs.

FIG. 11 is a perspective view of the sensor connection busbar 44. The sensor connection busbar 44 preferably is substantially in the shape of a circular arc, in accord with the shape of the busbar holder body portion 211. The terminal portion 442 is arranged to extend radially outward from a circular arc portion 441.

Electronic component connection portions 443, 444, and 445 are arranged to project radially inward and downward from the circular arc portion 441. As illustrated in FIGS. 3 and 5, the electronic component connection portions 443, 444, and 445 are arranged to project radially inward from inner surfaces of through holes 251, 252, and 261, respectively, and are exposed on both axial sides of the busbar holder 21. Each of the electronic component connection portions 443, 444, and 445 is connected with one of the resistors 71.

Sensor connection portions 446, 447, and 448 are arranged to project radially inward and upward from the circular arc portion 441. As illustrated in FIGS. 2 and 5, the sensor connection portions 446, 447, and 448 are arranged to project radially inward from the inner surfaces of the through holes 251, 252, and 253, respectively, and are exposed on both axial sides of the busbar holder 21. The sensor connection portions 446, 447, and 448 preferably include projection portions 446b, 447b, and 448b raised axially, respectively. Each of the projection portions 446b, 447b, and 448b is connected with the power supply terminal 61a.

In addition, the positioning portions 449, each of which is in the shape of a plane and substantially perpendicular to the axial direction, are arranged radially inside the circular arc portion 441. The positions of the positioning portions 449 correspond to the positions of through holes 286 (see FIGS. 2 and 5). That is, the positioning portions 449 are exposed on both axial sides of the busbar holder 21 through the through holes 286.

Figure 12:
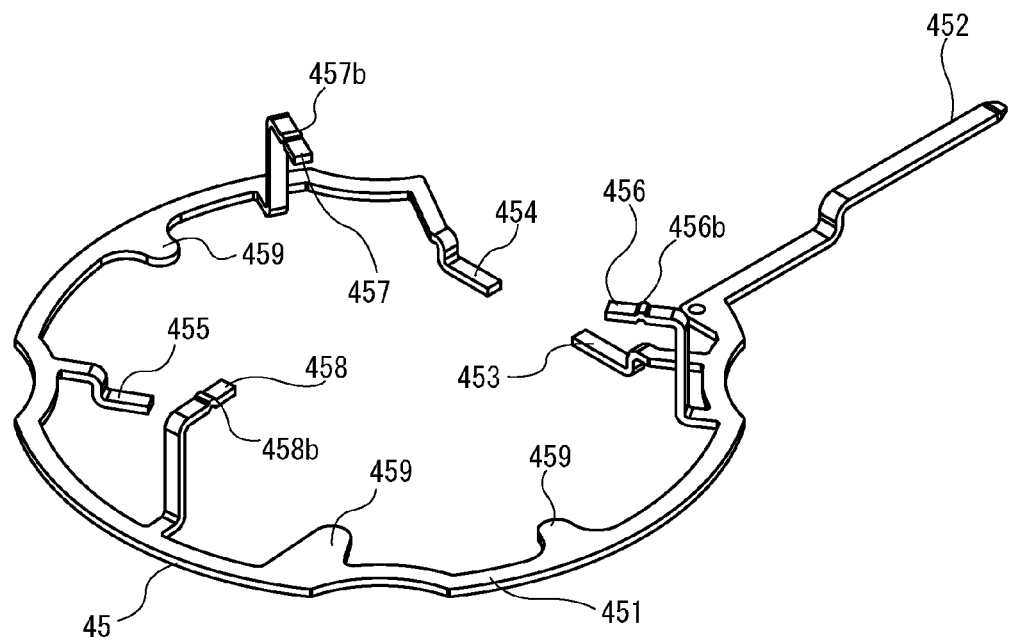
FIG. 12 is a perspective view of a sensor connection busbar according to a preferred embodiment of the present invention used to ground the Hall ICs.

FIG. 12 is a perspective view of the sensor connection busbar 45. The sensor connection busbar 45 is substantially in the shape of a circular arc, in accord with the shape of the busbar holder body portion 211. The terminal portion 452 is arranged to extend radially outward from a circular arc portion 451.

Electronic component connection portions 453, 454, and 455 are arranged to project radially inward and downward from the circular arc portion 451. As illustrated in FIGS. 3 and 5, the electronic component connection portions 453, 454, and 455 are arranged to project from the inner surfaces of the through holes 262, 262, and 263, respectively, and are exposed on both axial sides of the busbar holder 21. Each of the electronic component connection portions 453, 454, and 455 is connected with one of the capacitors 72.

Sensor connection portions 456, 457, and 458 are arranged to project radially inward and upward from the circular arc portion 451. As illustrated in FIGS. 2 and 5, the sensor connection portions 456, 457, and 458 are arranged to project radially inward from the inner surfaces of the through holes 251, 252, and 253, respectively, and are exposed on both axial sides of the busbar holder 21. The sensor connection portions 456, 457, and 458 have projection portions 456b, 457b, and 458b raised axially, respectively. Each of the projection portions 456b, 457b, and 458b is connected with the ground terminal 61b.

In addition, positioning portions 459, each of which is in the shape of a plane and is arranged perpendicular or substantially perpendicular to the axial direction, are arranged radially inside the circular arc portion 451. The positions of the positioning portions 459 correspond to the positions of through holes 287 (see FIGS. 2 and 5). That is, the positioning portions 459 are exposed on both axial sides of the busbar holder 21 through the through holes 287.

Figure 13:
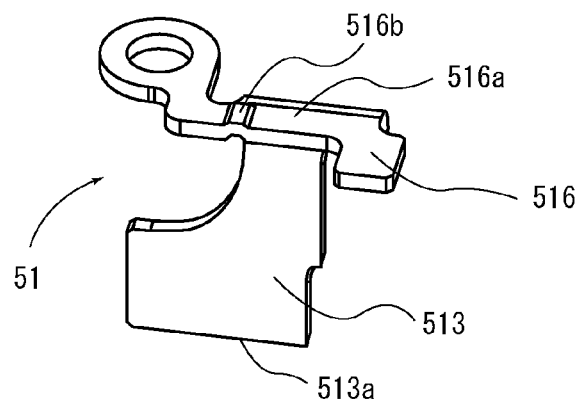
FIG. 13 is a perspective view of a sensor connection busbar according to a preferred embodiment of the present invention to be connected with an output terminal of one of the Hall ICs.
Figure 14:
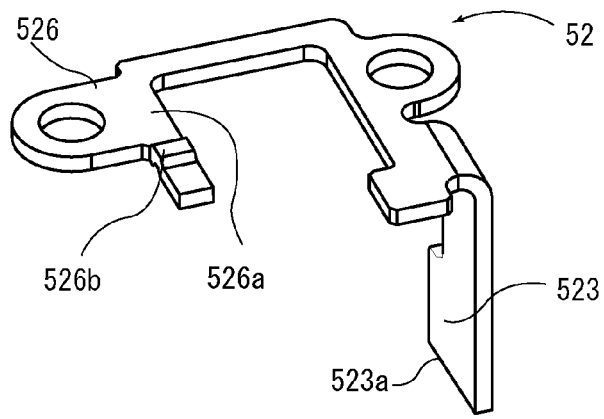
FIG. 14 is a perspective view of a sensor connection busbar according to a preferred embodiment of the present invention that is arranged to be connected with an output terminal of one of the Hall ICs.
Figure 15:
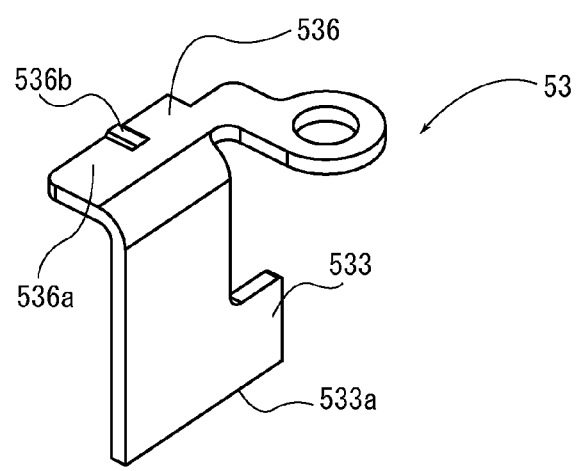
FIG. 15 is a perspective view of a sensor connection busbar according to a preferred embodiment of the present invention that is arranged to be connected with an output terminal of one of the Hall ICs.

FIG. 13 is a perspective view of the sensor connection busbar 51. FIG. 14 is a perspective view of the sensor connection busbar 52. FIG. 15 is a perspective view of the sensor connection busbar 53.

As illustrated in FIG. 13, the sensor connection busbar 51 includes an electronic component connection portion 513 and a sensor connection portion 516. The electronic component connection portion 513 is inserted into the through hole 251 (see FIG. 5) from above. Accordingly, a top end 513a of the electronic component connection portion 513 is arranged to project from the bottom surface portion 22 to be connected with two of the resistors 71. The sensor connection portion 516 has a projection portion 516b raised upward from a plane portion 516a. The projection portion 516b is connected with the output terminal 61c.

Similarly, an electronic component connection portion 523 of the sensor connection busbar 52 illustrated in FIG. 14 is inserted into a through hole 272 (see FIG. 5) from above. A top end 523a of the electronic component connection portion 523 arranged to project from the bottom surface portion 22 is connected with two of the resistors 71. A sensor connection portion 526 has a projection portion 526b raised upward from a plane portion 526a. The projection portion 526b is connected with the output terminal 61c.

An electronic component connection portion 533 of the sensor connection busbar 53 illustrated in FIG. 15 is inserted into a through hole 273 (see FIG. 5) from above. A top end 533a of the electronic component connection portion 533 arranged to project from the bottom surface portion 22 is connected with two of the resistors 71. A sensor connection portion 536 has a projection portion 536b raised upward from a plane portion 536a. The projection portion 536b is connected with the output terminal 61c.

As illustrated in FIG. 3, the sensor connection busbar 46 is an electrically conductive member preferably arranged substantially in the shape of a circular arc. The sensor connection busbar 46 is arranged as an extension cable to connect one of the resistors 71 and one of the capacitors 72 to the sensor connection busbar 43 positioned on an opposite side of the center hole 241. One end of the sensor connection busbar 46 defines the electronic component connection portion 463, and is connected with the sensor connection busbar 43. The other end of the sensor connection busbar 46 defines an electronic component connection portion 464, and is exposed on both axial sides of the busbar holder 21 in the through hole 253. The electronic component connection portion 464 is connected with the resistor 71 and the capacitor 72.

Note that, as explained above with reference to FIG. 4, the coil connection busbar 31 and the sensor connection busbars 44 and 45 are arranged one above another along the axial direction. However, the positioning portions 314, 449, and 459 are not arranged one above another along the axial direction. Similarly, the coil connection busbar 33 and the sensor connection busbars 44 and 45 are arranged one above another along the axial direction. However, the positioning portions 334, 449, and 459 are not arranged one above another along the axial direction.

The busbar unit 20, having the above-described structure, is connected to the power supply unit through the control unit (not shown), such as the ECU. Specifically, as illustrated in FIG. 7, each of the terminal portions 312, 322, 332, 412, 422, 432, 442, and 452 is connected to the control unit through a lead wire. Here, each of the coil connection busbars 31, 32, and 33 corresponds to a separate one of U, V, and W phases. This allows three-phase electrical currents in accordance with the Hall signals outputted from the Hall ICs 61 to be supplied to the coils 13 through the coil connection busbars 31, 32, and 33.

The assemblage of the busbar unit 20 will now be described below. First, the busbar holder 21, the coil connection busbars 31, 32, and 33, and the sensor connection busbars 41, 42, 43, 44, and 45 are integrally formed by, for example, the insert molding.

Specifically, the coil connection busbars 31, 32, and 33 and the sensor connection busbars 41, 42, 43, 44, and 45 are arranged inside a mold for the busbar holder 21 in a state as illustrated in FIG. 4. That is, jigs (not shown) are brought from both axial sides into contact with the positioning portion 314, the extension portion 324, and the positioning portion 334 to fix the coil connection busbars 31, 32, and 33, respectively. Jigs are brought from both axial sides into contact with the electronic component connection portions 413, 423, and 433 to fix the sensor connection busbars 41, 42, and 43, respectively. Note that the jig which is brought from the upper side into contact with the electronic component connection portion 433 is passed through the through hole 325 (see FIG. 9) defined in the coil connection busbar 32 before being brought into contact with the electronic component connection portion 433. Jigs are brought from both axial sides into contact with the positioning portions 449 and 459 to fix the sensor connection busbars 44 and 45, respectively.

Thereafter, a resin material is poured into the mold for the busbar holder 21. The jigs used to support the busbars are drawn away from the busbar holder 21 after the resin material is solidified, so that the through holes 281, 282, 283, 284, 285, 286, and 287 are defined. The busbar holder 21 is preferably formed in the above-described manner.

Next, the sensor connection busbars 51, 52, and 53 are attached to the busbar holder 21. Specifically, the electronic component connection portions 513, 523, and 533 are inserted into the through holes 251, 272, and 273, respectively, from above the upper surface portion 23. In addition, projection portions 225 defined on the upper surface portion 23 are inserted into holes defined in the sensor connection busbars 51, 52, and 53. The projection portions 225 are subjected to, for example, heat welding (i.e., are heated and crushed) so that the sensor connection busbars 51, 52, and 53 are fixed to the busbar holder 21.

Next, each end portion of the conductor wires 130 defining the coils 13 is connected with the conductor wire connection portion 313, 323, or 333 through, for example, Tungsten Inert Gas (TIG) welding.

Here, by way of example, how the end portions of the conductor wires 130 are welded to the conductor wire connection portion 323 will now be described below. FIG. 16 is a diagram illustrating the conductor wire connection portion 323 and the end portions of the conductor wires 130 prior to the welding. FIG. 17 is a diagram illustrating the conductor wire connection portion 323 and the end portions of the conductor wires 130 after the welding.

As illustrated in FIG. 16, while the conductor wires 130 are inserted from the upper side of the busbar holder 21 through the conductor wire connection portion 323, the side wall portions 323*a* and 323*c* are bent so as to enclose the conductor wires 130. As a result, the side wall portions 323*a*, 323*b*, and 323*c* and the end portions of the conductor wires 130 are brought into contact with each other.

Thereafter, a ground electrode and a tungsten electrode used for the TIG welding are inserted into the through hole 262 from the lower side of the busbar holder 21. The tungsten electrode is positioned below the end portions of the conductor wires 130. The ground electrode is brought into contact with the extension portion 324. An arc is created between the tungsten electrode and the end portions of the conductor wires 130 to melt the end portions of the conductor wires 130 and next the side wall portions 323*a*, 323*b*, and 323*c*. As a result, the conductor wire connection portion 323 and the end portions of the conductor wires 130 are welded to each other.

As a result, the conductor wire connection portion 323 and the end portions of the conductor wires 130 are now in a state as illustrated in FIG. 17. Because the conductor wire connection portion 323 is exposed on both axial sides of the busbar holder 21, it is possible to insert the tungsten electrode and the ground electrode from an opposite direction to that from which the conductor wires 130 are inserted. Therefore, it is possible to prevent the conductor wires 130 from coming into contact with the tungsten electrode 74 or the ground electrode 75 at the time of the welding.

The inward bending of the side wall portions 323*a* and 323*c* contributes to a reduction in an area of contact between the conductor wire connection portion 323 and the conductor wires 130. This accordingly leads to a reduction in an area where the conductor wire connection portion 323 is melted, making it easier to weld the end portions of the conductor wires 130 to the conductor wire connection portion 323. In a similar manner, each of the conductor wire connection portions 313 and 333 is connected with the corresponding end portions of the conductor wires 130 through the TIG welding.

Note that the conductor wire connection portion 323 may be connected with the end portions of the conductor wires 130 through, for example, resistance welding. For example, it is possible to weld the end portion of the conductor wire 130 and the side wall portion 323*a* to each other by placing two electrodes used for the resistance welding in contact with the side wall portion 323*a* and the end portion of the conductor wire 130, respectively. This method can also be employed to achieve the resistance welding between the side wall portions 323*b* and 323*c* and the end portions of the conductor wires 130.

Figure 18:
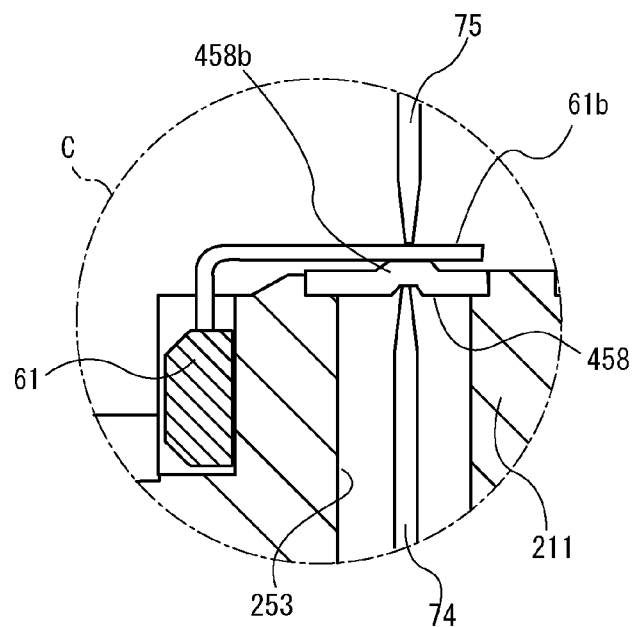
FIG. 18 is a diagram illustrating the state of a terminal of one of the Hall ICs and a sensor connection portion according to a preferred embodiment of the present invention prior to welding.

Next, the Hall IC 61 is arranged in each of the plurality of sensor holders 244. The terminal of each Hall IC 61 is connected with the projection portion of the corresponding sensor connection portion through the resistance welding. FIG. 18 is a diagram illustrating an arrangement of the electrodes 74 and 75 when the sensor connection portion 458 and the ground terminal 61*b* are welded to each other. Note that FIG. 18 is a figure corresponding to area C indicated in FIG. 6. As illustrated in FIG. 18, the electrode 74 is passed through the through hole 253 from the lower side to come into contact with the projection portion 458*b*, while the electrode 75 is passed through the through hole 253 from the upper side to come into contact with the ground terminal 61*b*. An electrical current is applied across the projection portion 458*b* and the ground terminal 61*b* to weld the projection portion 458*b* and the ground terminal 61*b* to each other. In a similar manner, the terminal of each of the other Hall ICs is welded to the corresponding sensor connection portion. Note that the TIG welding, instead of the resistance welding, may be employed to achieve the welding between each Hall IC and the corresponding sensor connection portion.

As described above, because the sensor connection portion 458 is exposed on both axial sides of the busbar holder 21, it is possible to insert the electrode 74 from an opposite direction to that from which the electrode 75 is inserted. This makes it possible to shorten the distance between the electrodes 74 and 75, across the sensor connection portion 458 and the ground terminal 61*b*, thereby shortening a path over which the electrical current flows at the time of the welding. In addition, the provision of the projection portion 458*b* in the sensor connection portion 458 contributes to reducing an area of contact between the sensor connection portion 458 and the ground terminal 61b, and thereby increasing efficiency in the welding operation.

Next, the sensor connection busbar 46, the plurality of resistors 71, and the plurality of capacitors 72 are arranged on the bottom surface portion 22 of the busbar holder body portion 211. Thereafter, the resistors 71 and the capacitors 72 are connected with the corresponding electronic component connection portions through the resistance welding. The busbar unit 20 is assembled in the above-described manner.

Figure 19:
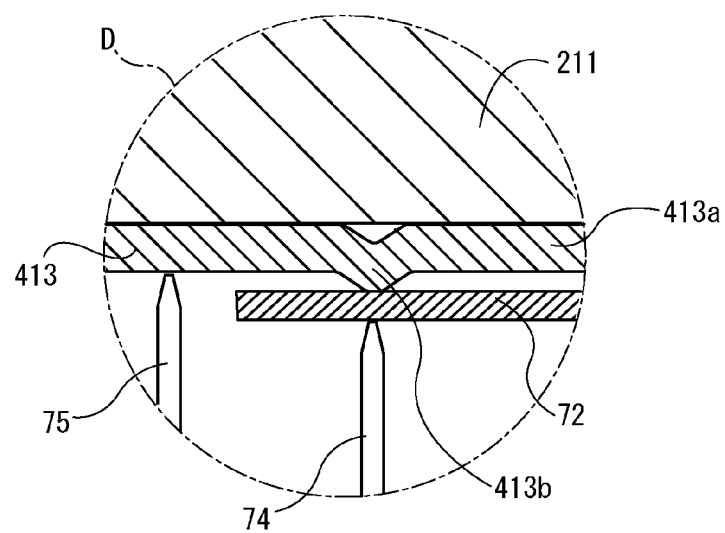
FIG. 19 is a diagram illustrating the state of an electronic component connection portion and an end portion of a capacitor according to a preferred embodiment of the present invention prior to welding.

FIG. 19 is a diagram illustrating a state of the electronic component connection portion 413 and an end portion of one of the capacitors 72 prior to the welding. Note that FIG. 19 is a radial cross-sectional view of the electronic component connection portion 413, and corresponds to area D indicated in FIG. 6. As illustrated in FIG. 19, the electrodes 74 and 75 are brought from below into contact with the end portion of the capacitor 72 and the electronic component connection portion 413, respectively. An electrical current is applied across the end portion of the capacitor 72 and the electronic component connection portion 413 to weld the end portion of the capacitor 72 to the projection portion 413b of the electronic component connection portion 413. The provision of the projection portion 413b in the electronic component connection portion 413 contributes to reducing an area of contact between the electronic component connection portion 413 and the end portion of the capacitor 72, and thereby increasing efficiency in the welding operation. In a similar manner, the electronic component connection portion 413 and one of the resistors 71 are welded to each other. In addition, one of the resistors 71 and one of the capacitors 72 are welded to the electronic component connection portion 423. The electronic component connection portions 433 and 463 are welded to each other.

Also, as described above, the electronic component connection portions 443, 444, 445, 453, 454, 455, and 464 are exposed on both axial sides of the busbar holder 21. Accordingly, each of the electronic component connection portions 443, 444, 445, 453, 454, 455, and 464 is welded to the resistor 71 or the capacitor 72 in a similar manner to that in which the sensor connection portion 458 and the ground terminal 61b are welded to each other. This makes it possible to shorten the distance between the electrodes 74 and 75, across the electronic component connection portion and the electronic component, and thereby to increase efficiency in the welding operation. Note that the TIG welding, instead of the resistance welding, may be employed to achieve the welding between each Hall IC 61 and the corresponding sensor connection portion.

As described above, in the brushless motor 1 according to the present preferred embodiment, the busbar holder 21 is arranged to hold the ball bearing 17B and the plurality of Hall ICs 61, and is provided with the connector portion 212 and the Hall IC circuit. This concentration of various functions in the busbar unit 20 makes it possible to reduce the number of parts used when assembling the brushless motor 1, and makes it easy to assemble the brushless motor 1.

Moreover, the coil connection busbar 31 and the sensor connection busbars 44 and 45 are arranged one above another along the axial direction, while the coil connection busbar 33 and the sensor connection busbars 44 and 45 are arranged one above another along the axial direction. This contributes to reducing the radial dimension of the busbar unit 20, and thereby reducing the size of the brushless motor 1.

Furthermore, the conductor wire connection portions 313, 323, and 333 of the coil connection busbars 31, 32, and 33 are exposed on both axial sides of the busbar holder 21. This enables an efficient welding operation when welding each conductor wire connection portion to the corresponding end portions of the conductor wires. Furthermore, the electronic component connection portions and the sensor connection portions of the sensor connection busbars 44, 45, and 46, and the sensor connection portions of the sensor connection busbars 51, 52, and 53, are each exposed on both axial sides of the busbar holder 21. This enables an efficient welding operation when welding each sensor connection portion to the terminal of the corresponding Hall IC, and welding each electronic component connection portion to the corresponding resistor or capacitor.

Note that, although only one positioning portion 314 or 334 is provided in each of the coil connection busbars 31 and 33 in the preferred embodiments described above, the present invention is not limited thereto. The number of positioning portions 314 or 334 may vary according to the shape or size of the coil connection busbar 31 or 33. Also, the coil connection busbar 32 may be provided with a positioning portion.

Similarly, the number of positioning portions 449 or 459 in the sensor connection busbar 44 or 45 may vary according to the shape, size, or the like of the sensor connection busbar 44 or 45. Also, the sensor connection busbars 41, 42, and 43 may be provided with a positioning portion.

Also, although each of the sensor connection portions 446, 447, 448, 456, 457, and 458 is exposed on both axial sides of the busbar holder 21 in the present preferred embodiment described above, the present invention is not limited thereto. Holes opening to only one axial side may be defined at positions corresponding to the sensor connection portions 446, 447, 448, 456, 457, and 458, so that the sensor connection portions 446, 447, 448, 456, 457, and 458 are exposed on only one axial side. Similarly, the electronic component connection portions 443, 444, 445, 453, 454, 455, 463, and 464 may be exposed on only one axial side.

Furthermore, although three coil connection busbars each corresponding to one of the U, V, and W phases are provided in the present preferred embodiment described above, the present invention is not limited thereto. The number of coils 13 varies according to the number of slots or the number of phases of the brushless motor, and accordingly, a change may be made to the number of coil connection busbars or conductor wire connection portions according to the present preferred embodiments.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A motor comprising:
a rotor arranged to rotate about a rotation axis;
a stator core including a plurality of teeth;
a sensor magnet;
a plurality of coils, each defined by a conductor wire wound around a separate one of the teeth; and
a busbar unit arranged to supply a drive current to each coil; wherein
the busbar unit includes:
    a plurality of coil connection busbars, each including a conductor wire connection portion connected with an end portion of the conductor wire; and
    a busbar holder made of an insulating material and arranged to support the plurality of coil connection busbars;

the busbar holder includes a bearing holder arranged to hold a bearing arranged to rotatably support a shaft arranged to rotate integrally with the rotor;

the bearing is arranged to overlap with at least one of the plurality of coil connection busbars in a radial direction;

the busbar holder and the bearing holder are provided as a single monolithic member made from the insulating material;

at least a portion of the bearing holder is adjacent to the bearing in an axial direction with at least the portion of the bearing holder being arranged axially between the sensor magnet and the bearing;

the busbar holder includes a plurality of sensor holders, each holding a separate one of a plurality of sensors arranged to detect a rotational position of the rotor by detecting the sensor magnet;

the busbar unit further includes a plurality of sensor connection busbars arranged to input and output electrical signals to or from the sensors held in the respective sensor holders; and the plurality of sensor connection busbars includes a base portion substantially in the shape of a circle or an arc and a terminal portion arranged to extend radially outward from the base portion, and the base portion overlaps the bearing holder in a radial direction.

2. The motor according to claim 1, wherein each of the sensors held in the respective sensor holders is arranged radially outwardly opposite a sensor magnet arranged to rotate integrally with the rotor, with a gap between each sensor and the sensor magnet.

3. The motor according to claim 1, wherein at least one of the plurality of sensor connection busbars includes sensor connection portions each directly connected with a terminal of a separate one of the sensors; and the busbar holder includes second exposure holes defined at positions corresponding to those of the sensor connection portions to allow the sensor connection portions to be exposed on both axial sides, the second exposure holes passing through the busbar holder in the axial direction.

4. The motor according to claim 1, wherein at least one of the plurality of sensor connection busbars includes sensor connection portions each directly connected with a terminal of a separate one of the sensors; and the busbar holder includes opening holes defined at positions corresponding to those of the sensor connection portions to allow the sensor connection portions to be exposed on one axial side.

5. The motor according to claim 1, wherein at least two of the plurality of sensor connection busbars are arranged one above another along the axial direction.

6. The motor according to claim 1, wherein at least one of the plurality of coil connection busbars and at least one of the plurality of sensor connection busbars are arranged one above another along the axial direction.

7. The motor according to claim 1, wherein the busbar unit further includes another electronic component other than the plurality of sensors; and the other electronic component is arranged on a side of the busbar holder opposite to a side thereof facing the stator core.

8. The motor according to claim 1, wherein the motor is arranged in a transmission of a vehicle or is arranged to drive a clutch of the vehicle.

* * * * *